Aug. 4, 1931.  E. W. McSHEEN  1,817,758
PHONOGRAPH APPARATUS
Filed Nov. 20, 1929
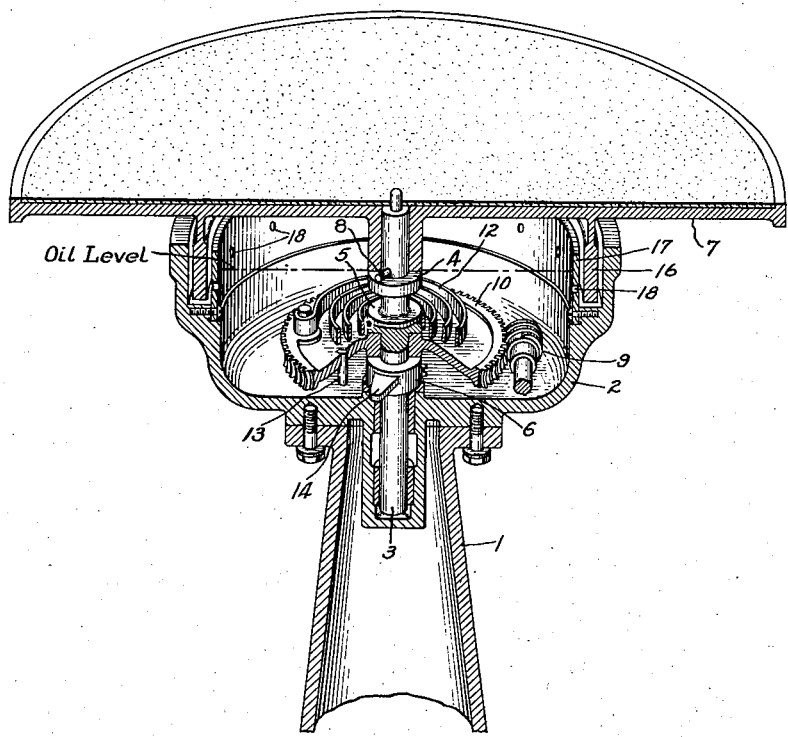
Inventor
Edward W. McSheen,
by Charles E. Mullen
His Attorney.

Patented Aug. 4, 1931

1,817,758

UNITED STATES PATENT OFFICE

EDWARD W. McSHEEN, OF SCHENECTADY, NEW YORK, ASSIGNOR TO GENERAL ELECTRIC COMPANY, A CORPORATION OF NEW YORK

PHONOGRAPH APPARATUS

Application filed November 20, 1929. Serial No. 408,590.

My invention relates to phonograph apparatus and particularly to that part of such apparatus by which a sound record disk is rotated at a uniform speed. It is the object of my invention to provide an improved apparatus of this character which is of simple construction and which will effectively damp or smooth out oscillations or other speed variations such as arise from the driving mechanism.

My invention will be better understood from the following description taken in connection with the accompanying drawing, and its scope will be pointed out in the appended claims.

Referring to the drawing wherein the single figure is a cross sectional view of an embodiment of my invention, 1 represents a pedestal upon which is secured the circular enclosing casing 2. Journalled in the bottom of the casing is the shaft 3 having the integral collars 4 and 5 and the detachable collar 6. Upon the upper end of the shaft is detachably mounted the turn-table 7, the hub of which rests on the upper collar 4 and is removed by merely lifting it off. When in its normal position the turntable is keyed to the shaft by the pin 8 fitting in a slot in the end face of the hub of the turntable. The turntable is driven by a motor, not shown, through suitable speed reducing gears shown for example as the worm 9 and the worm wheel 10. The latter is loosely mounted on shaft 3 between collars 5 and 6, and is resiliently connected to collar 5 by the coil spring 12 whereby the torque necessary to rotate the shaft and turntable is transmitted through this spring. To limit the relative movement of shaft and worm wheel and to prevent excessive stressing of the spring, the worm gear is provided with the pin 13 which is arranged to engage the stop 14 on the collar 6. In starting the apparatus, particularly when a motor is used having a high starting torque such as a synchronous motor, severe oscillations are likely to be set up in the turntable because of the resilient drive connection between it and the worm wheel. To damp out these oscillations I have provided the viscous damper which I shall now describe.

Secured to and preferably formed integral with the turntable is the concentric ring 16 which rotates in a bath of viscous liquid. The surface of the ring preferably runs close to the fixed wall of the liquid container which may be constructed in any desired manner. I have shown it as formed in the upper edge of the casing 2, the same oil which fills the casing for the lubrication of the gears and shaft bearing serving also to damp the movement of the ring 16. Greater damping may be effected by employing the partition 17 so as to form an annular channel or trough for the ring 16. In this case a separate liquid may be used for damping than for lubrication. If the same liquid is to be used for both purposes I provide suitable openings in the partition 17 such as the holes 18. In accordance with this construction the damping ring is directly connected with the turntable which it controls, is of maximum diameter permissible with the housing employed and offers no impediment to the convenient and quick removal of the turntable.

What I claim as new and desire to secure by Letters Patent of the United States, is,—

1. Phonograph apparatus comprising an enclosing casing having a portion forming an upwardly opening circular trough containing a viscous liquid, a shaft journalled in said casing, a turntable resting on said shaft having an integral downwardly extending concentric damping ring arranged to rotate in said trough, a driving gear on said shaft, and a spring connecting the driving gear and the shaft.

2. Phonograph apparatus comprising an enclosing casing containing lubricating liquid and having a portion forming an upwardly opening circular trough, a shaft journalled in said casing, a turntable resting upon said shaft having an integral downwardly extending concentric damping ring arranged to rotate in said trough, and drive gearing for the shaft arranged in said casing, the inner wall of said trough having openings therein whereby the lubricating liquid in said casing communicates with said trough.

In witness whereof, I have hereunto set my hand this 19th day of November, 1929.

EDWARD W. McSHEEN.